United States Patent
Swoboda et al.

(10) Patent No.: US 7,299,386 B2
(45) Date of Patent: Nov. 20, 2007

(54) APPARATUS AND METHOD FOR DETECTING ADDRESS CHARACTERISTICS FOR USE WITH A TRIGGER GENERATION UNIT IN A TARGET PROCESSOR

(75) Inventors: Gary L. Swoboda, Sugar Land, TX (US); Jason L. Peck, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 555 days.

(21) Appl. No.: 10/729,592

(22) Filed: Dec. 5, 2003

(65) Prior Publication Data
US 2004/0153790 A1    Aug. 5, 2004

Related U.S. Application Data

(60) Provisional application No. 60/434,021, filed on Dec. 17, 2002.

(51) Int. Cl.
*G11B 20/20* (2006.01)
(52) U.S. Cl. ...................... 714/700; 712/227
(58) Field of Classification Search ................ 714/715, 714/732, 735, 736, 742, 750; 712/227
See application file for complete search history.

(56) References Cited

U.S. PATENT DOCUMENTS

| | | | | |
|---|---|---|---|---|
| 5,640,542 A | * | 6/1997 | Whitsel et al. ............... | 703/28 |
| 5,887,003 A | * | 3/1999 | Ranson et al. ............... | 714/736 |
| 6,035,422 A | * | 3/2000 | Hohl et al. .................... | 714/35 |
| 6,754,852 B2 | * | 6/2004 | Swoboda ....................... | 714/39 |
| 7,020,768 B2 | * | 3/2006 | Swaine et al. ............... | 712/228 |
| 2002/0184477 A1 | * | 12/2002 | Swaine et al. ............... | 712/227 |

* cited by examiner

*Primary Examiner*—Guy Lamarre
*Assistant Examiner*—Sam Rizk
(74) *Attorney, Agent, or Firm*—William W. Holloway; W. James Brady; Frederick J. Telecky, Jr.

(57) ABSTRACT

A comparator unit includes first and second comparator components. The first and second comparator components exchange signals and generate signals when certain characteristics are met. The comparator unit finds application a target processor for generating event signals can be used in test and diagnostic environments to identify address signal groups having selected characteristics. Each comparator can determine a relationship of an address signal group to a selected address. When the two comparators are coupled together, the comparator unit can determine the relationship of an address signal group to a region defined by two addresses. In addition, the comparator unit can identify a relationship between two address signal groups, each address signal group being applied to a different one of the first and second comparators.

16 Claims, 4 Drawing Sheets

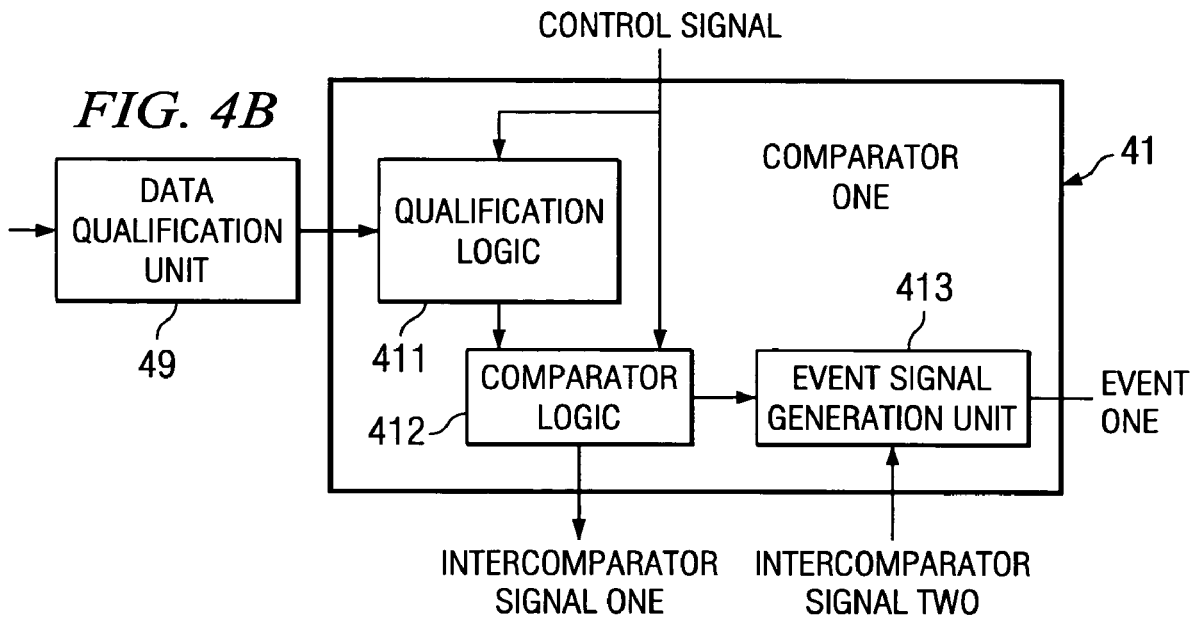
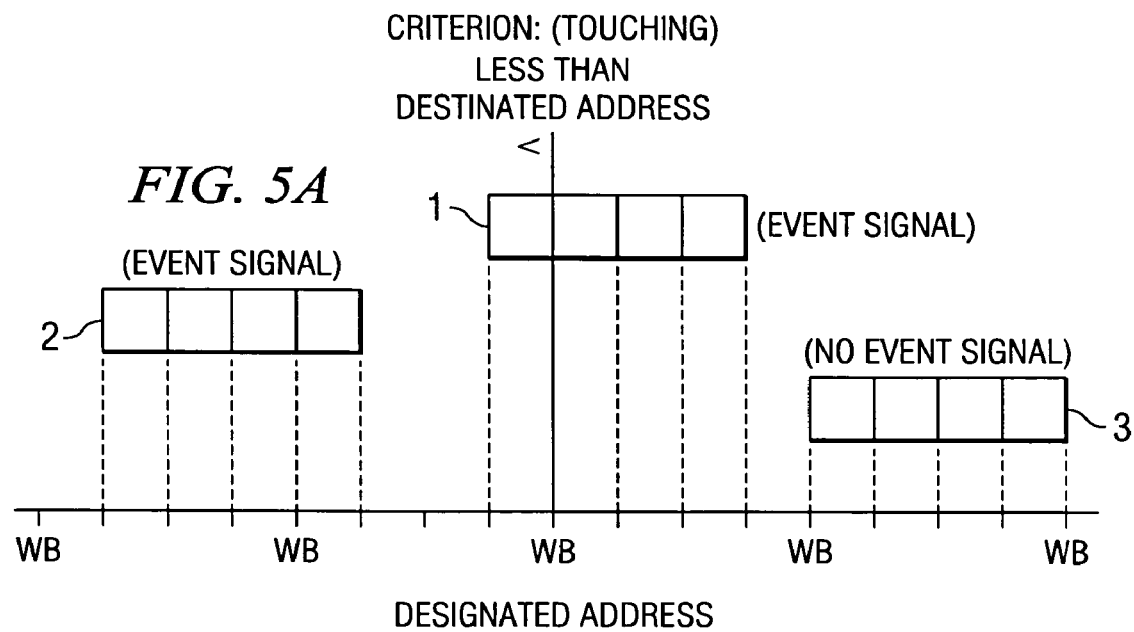

APPARATUS AND METHOD FOR DETECTING ADDRESS CHARACTERISTICS FOR USE WITH A TRIGGER GENERATION UNIT IN A TARGET PROCESSOR

This application claims priority under 35 USC §119(e)(1) of Provisional Application No. 60/434,021 filed Dec. 17, 2002.

RELATED APPLICATIONS

U.S. patent application Ser. No. 10/728,627, entitled APPARATUS AND METHOD FOR SYNCHRONIZATION OF TRACE STREAMS FROM MULTIPLE PROCESSORS, invented by Gary L. Swoboda, filed on even date herewith, and assigned to the assignee of the present application; U.S. patent application Ser. No. 10/729,212, entitled APPARATUS AND METHOD FOR SEPARATING DETECTION AND ASSERTION OF A TRIGGER EVENT, invented by Gary L. Swoboda, filed on even date herewith, and assigned to the assignee of the present application; U.S. patent application Ser. No. 10/729,239, entitled APPARATUS AND METHOD FOR STATE SELECTABLE TRACE STREAM GENERATION, invented by Gary L. Swoboda, filed on even date herewith, and assigned to the assignee of the present application; U.S. patent application Ser. No. 10/729,650, entitled APPARATUS AND METHOD FOR SELECTING PROGRAM HALTS IN AN UNPROTECTED PIPELINE AT NON-INTERRUPTIBLE POINTS IN CODE EXECUTION, invented by Gary L. Swoboda and Krishna Allam, filed on even date herewith, and assigned to the assignee of the present application; U.S. patent application Ser. No. 10/729,591, entitled APPARATUS AND METHOD FOR REPORTING PROGRAM HALTS IN AN UNPROTECTED PIPELINE AT NON-INTERRUPTIBLE POINTS IN CODE EXECUTION, invented by Gary L. Swoboda, filed on even date herewith, and assigned to the assignee of the present application; U.S. patent application Ser. No. 10/729,407, entitled APPARATUS AND METHOD FOR A FLUSH PROCEDURE IN AN INTERRUPTED TRACE STREAM, invented by Gary L. Swoboda, filed on even date herewith, and assigned to the assignee of the present application; U.S. patent application Ser. No. 10/729,564, entitled APPARATUS AND METHOD FOR CAPTURING AN EVENT OR COMBINATION OF EVENTS RESULTING IN A TRIGGER SIGNAL IN A TARGET PROCESSOR, invented by Gary L. Swoboda, filed on even date herewith, and assigned to the assignee of the present application; U.S. patent application Ser. No. 10/729,400, entitled APPARATUS AND METHOD FOR CAPTURING THE PROGRAM COUNTER ADDRESS ASSOCIATED WITH A TRIGGER SIGNAL IN A TARGET PROCESSOR, invented by Gary L. Swoboda, filed on even date herewith, and assigned to the assignee of the present application; U.S. patent application Ser. No. 10/729,639, entitled APPARATUS AND METHOD FOR TRACE STREAM IDENTIFICATION OF A PROCESSOR RESET, invented by Gary L. Swoboda, Bryan Thome and Manisha Agarwala, filed on even date herewith, and assigned to the assignee of the present application; U.S. Pat. No. 10/729,214, entitled APPARATUS AND METHOD FOR TRACE STREAM IDENTIFICATION OF A PROCESSOR DEBUG HALT SIGNAL, invented by Gary L. Swoboda, Bryan Thome, Lewis Nardini and Manisha Agarwala, filed on even date herewith, and assigned to the assignee of the present application; U.S. patent application Ser. No. 10/729,327, entitled APPARATUS AND METHOD FOR TRACE STREAM IDENTIFICATION OF A PIPELINE FLATTENER PRIMARY CODE FLUSH FOLLOWING INITIATION OF AN INTERRUPT SERVICE ROUTINE; invented by Gary L. Swoboda, Bryan Thome and Manisha Agarwala, filed on even date herewith, and assigned to the assignee of the present application; U.S. patent application Ser. No. 10/729,647, entitled APPARATUS AND METHOD FOR TRACE STREAM IDENTIFICATION OF A PIPELINE FLATTENER SECONDARY CODE FLUSH FOLLOWING A RETURN TO PRIMARY CODE EXECUTION, invented by Gary L. Swoboda, Bryan Thome and Manisha Agarwala filed on even date herewith, and assigned to the assignee of the present application; U.S. patent application Ser. No. 10/729,401, entitled APPARATUS AND METHOD IDENTIFICATION OF A PRIMARY CODE START SYNC POINT FOLLOWING A RETURN TO PRIMARY CODE EXECUTION, invented by Gary L. Swoboda, Bryan Thome and Manisha Agarwala, filed on even date herewith, and assigned to the assignee of the present application; U.S. patent application Ser. No. 10/729,326, entitled APPARATUS AND METHOD FOR IDENTIFICATION OF A NEW SECONDARY CODE START POINT FOLLOWING A RETURN FROM A SECONDARY CODE EXECUTION, invented by Gary L. Swoboda, Bryan Thome and Manisha Agarwala, filed on even date herewith, and assigned to the assignee of the present application; U.S. patent application Ser. No. 10/729,190, entitled APPARATUS AND METHOD FOR TRACE STREAM IDENTIFICATION OF A PAUSE POINT IN A CODE EXECTION SEQUENCE, invented by Gary L. Swoboda, Bryan Thome and Manisha Agarwala, filed on even date herewith, and assigned to the assignee of the present application; U.S. patent application Ser. No. 10/729,196, entitled APPARATUS AND METHOD FOR COMPRESSION OF A TIMING TRACE STREAM, invented by Gary L. Swoboda and Bryan Thome, filed on even date herewith, and assigned to the assignee of the present application; U.S. patent application Ser. No. 10/729,272, entitled APPARATUS AND METHOD FOR TRACE STREAM IDENTIFCATION OF MULTIPLE TARGET PROCESSOR EVENTS, invented by Gary L. Swoboda and Bryan Thome, filed on even date herewith, and assigned to the assignee of the present application; and U.S. patent application Ser. No. 10/729,191 entitled APPARATUS AND METHOD FOR OP CODE EXTENSION IN PACKET GROUPS TRANSMITTED IN TRACE STREAMS, invented by Gary L. Swoboda and Bryan Thome, filed on even date herewith, and assigned to the assignee of the present application are related applications.

BACKGROUND OF THE INVENTION

1. Field of the Invention

This invention relates generally to the testing of digital signal processing units and, more particularly, to the detection of trigger events in a target processor that result in the generation of a trigger signals. The trigger events are related to the program execution and information related to these events is used by the host processing unit to analyze the operation of the target processor by the host processing unit.

2. Description of the Related Art

As microprocessors and digital signal processors have become increasingly complex, advanced techniques have been developed to test these devices. Dedicated apparatus is available to implement the advanced techniques. Referring to FIG. 1A, a general configuration for the test and debug of a target processor 12 is shown. The test and debug procedures operate under control of a host processing unit 10. The host processing unit 10 applies control signals to the emulation unit 11 and receives (test) data signals from the emulation unit 11 by cable connector 14. The emulation unit 11 applies control signals to and receives (test) signals from the target processor 12 by connector cable 15. The emulation unit 11 can be thought of as an interface unit between the host processing unit 10 and the target processor 12. The emulation unit 11 must process the control signals from the host processor unit 10 and apply these signals to the target processor 12 in such a manner that the target processor will respond with the appropriate test signals. The test signals from the target processor 12 can be a variety types. Two of the most popular test signal types are the JTAG (Joint Test Action Group) signals and trace signals. The JTAG signal provides a standardized test procedure in wide use. Trace signals are signals from a multiplicity of junctions in the target processor 12. While the width of the bus interfacing to the host processing unit 10 generally have a standardized width, the bus between the emulation unit 11 and the target processor 12 can be increased to accommodate the increasing complexity of the target processing unit 12. Thus, part of the interface function between the host processing unit 10 and the target processor 12 is to store the test signals until the signals can be transmitted to the host processing unit 10.

Referring to FIG. 1B, the operation of the trigger generation unit 19 is shown. At least one event signal is applied to the trigger generation unit 19. Based on the event signals applied to the trigger generation unit 19, a trigger signal is selected. Certain events and combination of events, referred to as an event front, generate a selected trigger signal that results in certain activity in the target processor such as a debug halt. Combinations of different events generating trigger signals are referred to as jobs. Multiple jobs can have the same trigger signal or combination of trigger signals. In the test and debug of the target processor, the trigger signals can provide impetus for changing state in the target processor or for performing a specified activity. The event front defines the reason for the generation of trigger signal. This information is important in understanding the operation of the target processor because, as pointed out above, several combinations of events can result in the generation of a trigger signal. In order to analyze the operation of the target processing unit, the portion of the code resulting in the trigger signal must be identified. However, the events in the host processor leading to the generation of event signals can be complicated. Specifically, the characteristics of an instruction at a program counter address can determine whether a trigger signal should be generated. A trigger signal can indicate when an address is within a range of addresses, outside of a range of addresses, some combination of address characteristics, and/or the address is aligned with a reference address. In this instance, the address can be the program address of an instruction or a memory address directly or indirectly referenced by a program instruction.

A need has been felt for apparatus and an associated method having the feature that events corresponding to characteristics of the program counter address can be identified. It would be yet another feature of the apparatus and associated method to provide for the identification of program counter address characteristics that encompasses more than one range. It would be a still further feature of the present invention to identify program address characteristics that include the characteristics of the data identified by the program counter address. It would be still another feature of the apparatus and associated method to identify characteristics of addresses referenced by program instruction. It would be yet a further feature of the present invention to compare characteristics of two addresses.

SUMMARY OF THE INVENTION

The aforementioned and other features are accomplished, according to the present invention, by providing a comparator that can determine the relationship of either one or two addresses to a group of user selected characteristics. In particular, the comparator includes a first comparator unit and second comparator unit. In this manner, characteristics for one or for two addresses can be determined, i.e., whether two addresses meet relatively simple, and possible different requirements or a single address meets more complex requirements. In addition, the comparator can include apparatus responsive to requirements for a related data field for adding these data requirements to a decision requiring the address. Finally, a decision unit determines whether all the criteria for the address have been met and, when the criteria has been met, an event signal is generated. The event signal either alone or in combination with other event signals can result in a trigger signal. The trigger signal changes the operation of the target processor and event signal or signals resulting in a trigger signal are communicated to the host processing unit.

Other features and advantages of present invention will be more clearly understood upon reading of the following description and the accompanying drawings and the claims.

BRIEF DESCRIPTION OF THE DRAWINGS

FIG. 1A is a general block diagram of a system configuration for test and debug of a target processor, while

FIG. 4A is a block diagram of the comparator unit according to the present invention, while FIG. 4B is a block diagram of the principal components of each comparator in the comparator unit according to the present invention.

FIG. 5A, FIG. 5B and FIG. 5C illustrate the operation of the comparator unit according to the present invention.

DESCRIPTION OF THE PREFERRED EMBODIMENT

1. Detailed Description of the Figures

Figure 1A:
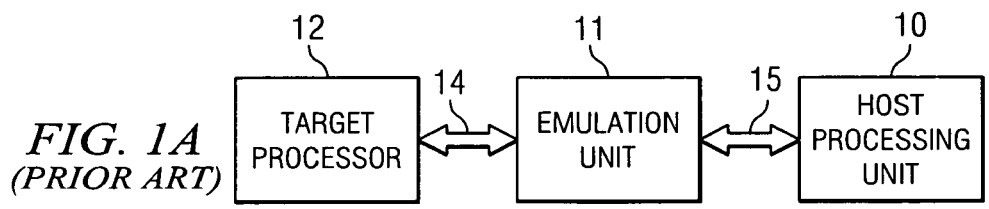
Figure 1B:
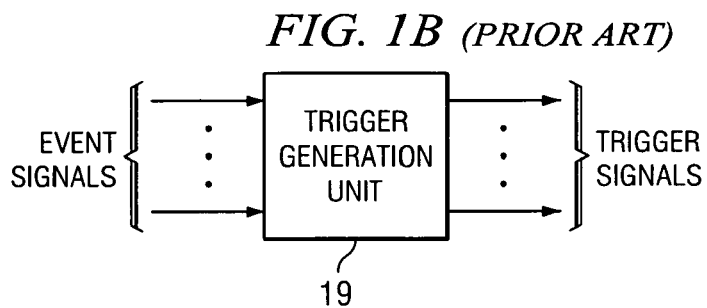
FIG. 1B illustrates the function of the trigger generation unit.

FIG. 1 has been described with respect to the related art.

Figure 2:
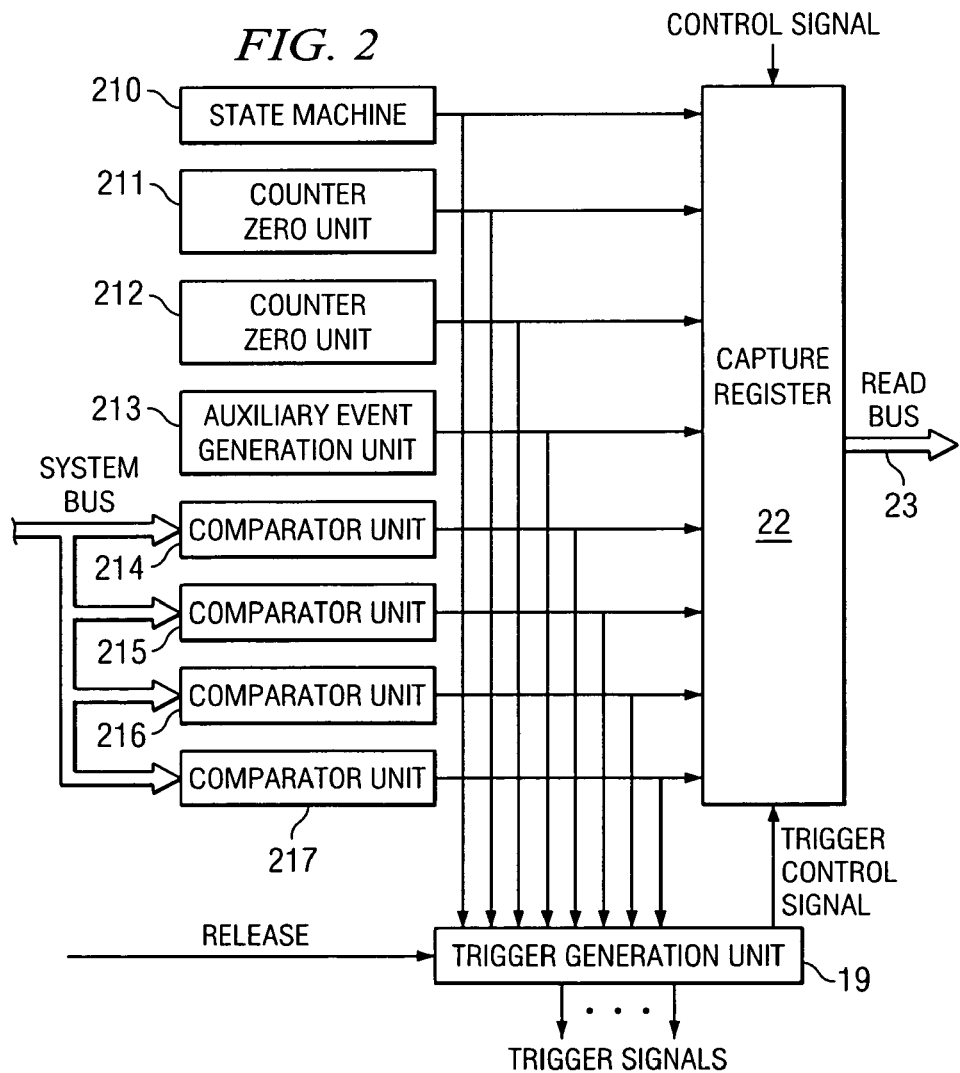
FIG. 2, a block diagram of the apparatus for storing the event signals that result in the generation of a trigger signal.

Referring to FIG. 2, a block diagram of the apparatus for capturing the identification of the events resulting in a trigger signal is shown. A plurality of target processing unit and test and debug components can provide an event signal under preselected conditions. The components generating event signals include a state machine 210 (determining the state in which the target processing unit is executing code), counter zero units 211 and 212 (determining when a preselected condition has been met), an auxiliary event generating unit 213 (providing an event signal for a predetermined condition of the target processor), and comparators 214-217 (for processing signals from a system bus). Each of the components providing event signals are coupled to a particular input terminal of trigger generation unit 19 and to an associated location in a capture register 22. When an event signal or preselected combination of event signals is identified by the trigger generation unit 19, an appropriate trigger signal is generated. Along with the trigger signal, the trigger generation unit 19 generates a control signal. The control signal results in the storage of the applied event signals in the capture register 22. The contents of the capture register 22 can be applied to a read bus 23 and subsequently transferred to the host processing unit for analysis.

Figure 3:
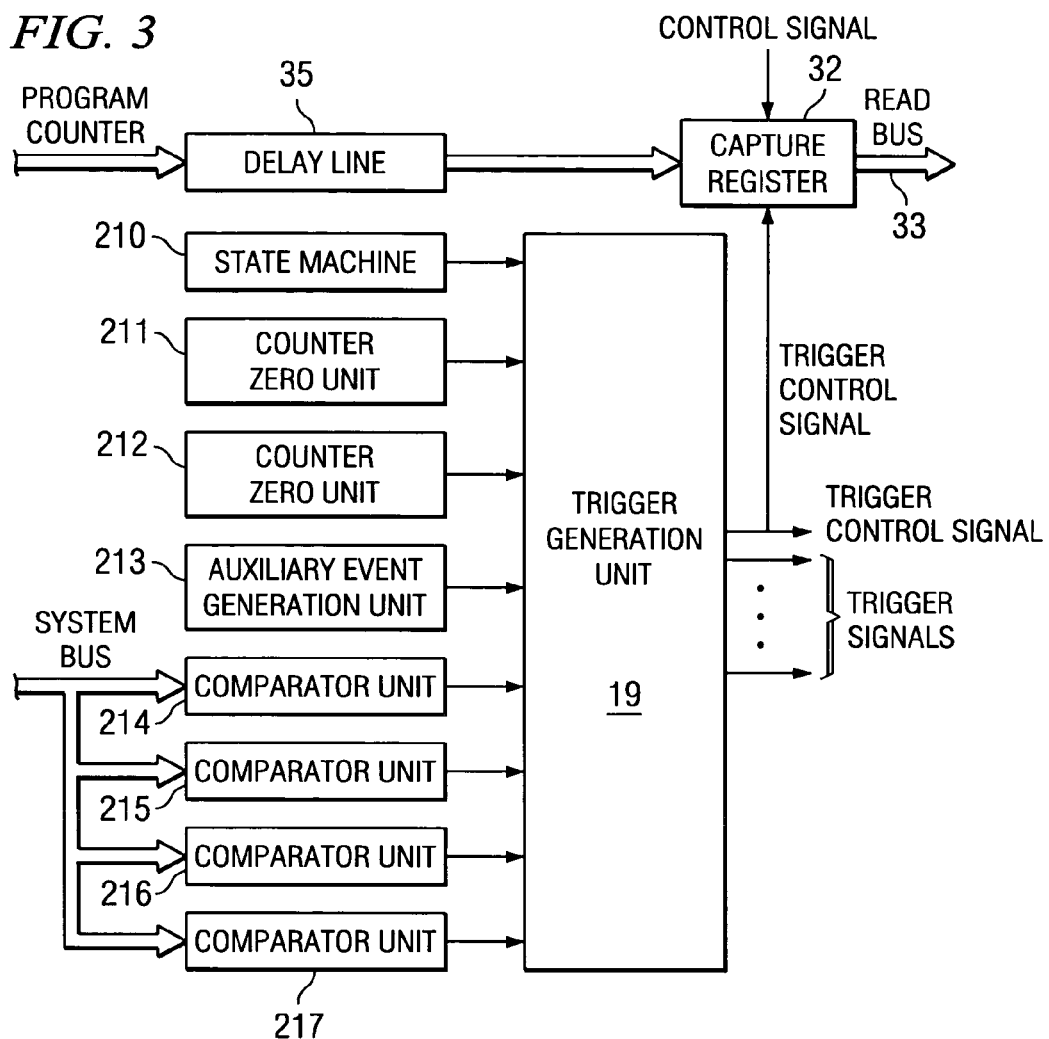
FIG. 3 is a block diagram of apparatus for storing the contents of the program counter related to the generation of the trigger signal according to the present invention.

Referring to FIG. 3, a block diagram of the apparatus for storing the contents of the program counter related to the generation of a trigger signal is shown. As in FIG. 2, the state machine 210, the counter zero units 211 and 212, the auxiliary event generator 213, and the comparators, 214-217, in the presence of preselected conditions, generate event signals that are applied to the trigger generation unit 19. In response to a preselected event signal or combination of event signals, the trigger generation unit 19 generates a trigger signal. The trigger signal causes a predetermined response by the target processor. In addition, the trigger generation unit 19 provides a trigger control signal. This trigger control signal is applied to register 32. The contents of program counter are applied through a delay line 35 to the register 32. In response to the trigger control signal, the program counter contents are stored in the register 32. In response to a control signal, the contents of register 32 can be transferred to the host processing unit.

Figure 4A:
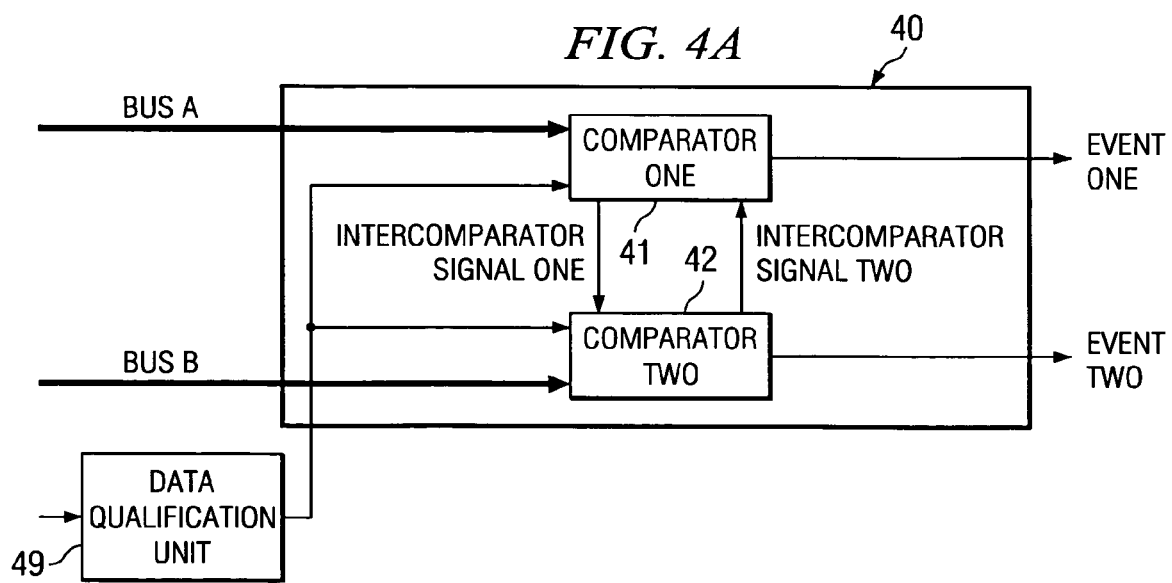

Referring to FIG. 4A, the over all structure of a comparator unit 40, according to the present invention, is shown. The comparator unit 40 includes a comparator one 41 and a comparator two 42. Comparator one 41 receives input signals from bus A and from data qualifying network 49. Comparator two 42 receives input signals from bus B and from the data qualifying network 49. Comparator one 41 generates an INTERCOMPARATOR ONE signal and applies this signal to comparator two 42. The comparator two 42 generates an INTERCOMPARATOR TWO signal and applies this signal to comparator one 41. Comparator one 41 provides an EVENT ONE output signal, while comparator two 42 provides an EVENT TWO output signal. The data qualifying network 49 is used to ensure that an event signal is generated when the address(es) being tested by the comparators 41 and 42 meet the requirements and the data accessed at the address has predetermined relationship, for example with a reference data value. While in the FIG. 4A one data qualifying network 49 is shown, a data qualifying network can be associated with each comparator 41 and 42.

Referring to FIG. 4B, components of the comparator one 41 are shown. Comparator one 41 includes a qualification logic 411. The data qualifying logic 411 receives a signal from the data qualifying network 49 and applies a signal to comparator logic 412. The comparator logic 412 has the bus A signals applied thereto. The comparator logic 412 applies a signal to the event signal generation unit 413 and generates the COMPARATOR ONE signal. The event signal generation unit 413 receives the INTERCOMPARTOR TWO signal and generates the EVENT ONE signal. The comparator logic 412 and qualification logic unit 411 also receive control signals. The control signals can include the parameters used in the comparator logic 412. The qualification logic 411 receives architecture-related signals such as whether a valid memory access was generated, whether the memory access was a read or write operation. These control signals can determine whether an operation of the processor meets preselected criteria.

Figure 5B:
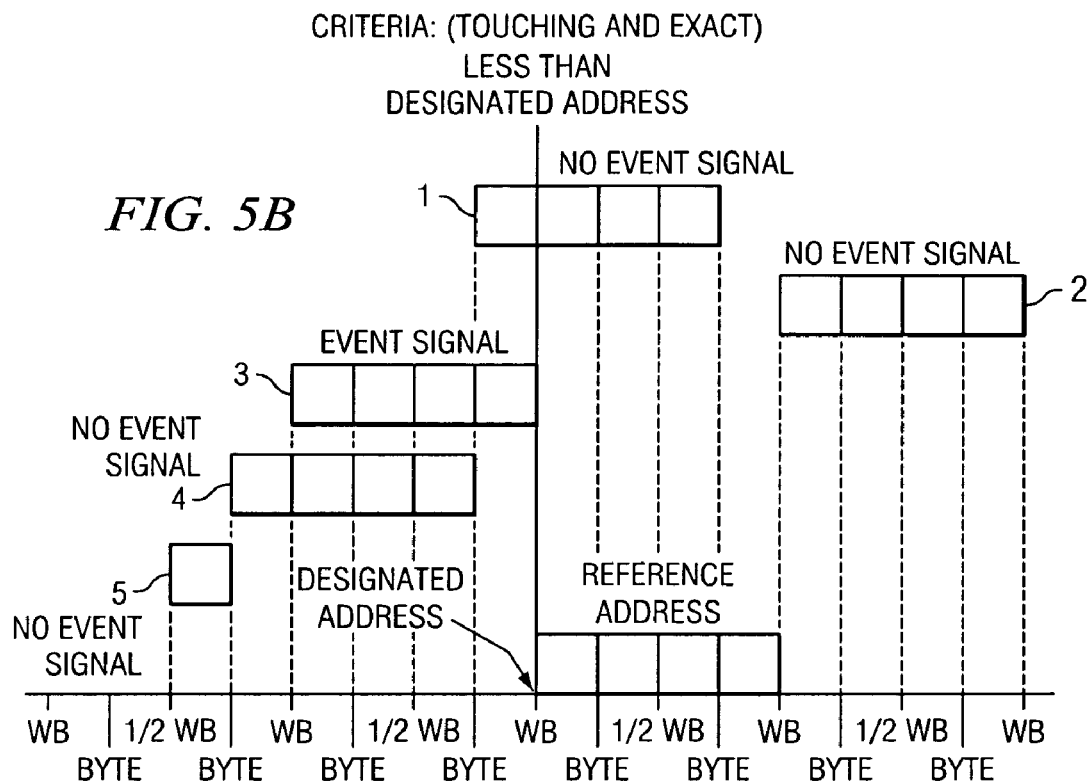
Figure 5C:
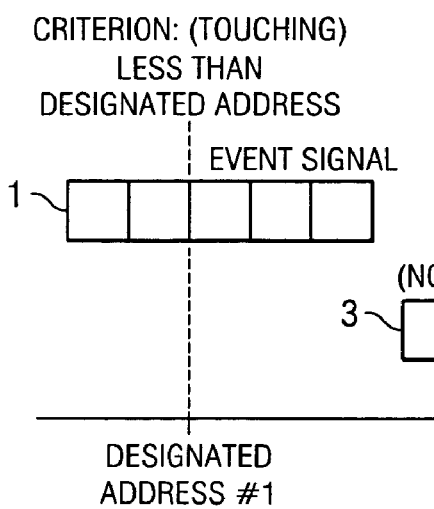
Figure 5C:
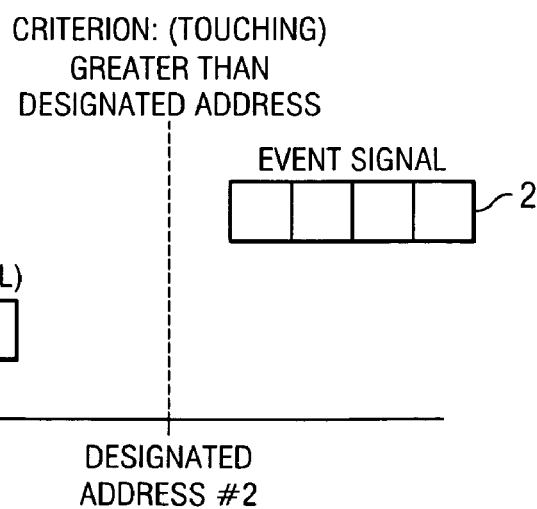

Referring to FIGS. 5A through 5C, the operations of the comparator unit for some exemplary conditions are illustrated. In FIG. 5A, an example of the operation of the comparator unit using only comparator one (or comparator two) is shown. In this example, the comparator provides an event signal when any portion of the address signal group is less that the designated address (shown by the arrow). The exemplary address signal groups are shown as word signal groups. Only the address with the no portion of the addressed signal group being less than the designated address provides no EVENT signal. (This criterion is one definition of a "touching" requirement). Thus, signal group 1 generates an event signal, a portion being less than the designated address. Signal group 2 also generates an event signal, the entire signal group being less than the designated address. Signal group 3 is entirely above the designated address and therefore does not meet the "less than" requirement.

FIG. 5B shows another type of event generation. In this example, the same touching criterion is used. In addition, the address signal group must be match-aligned with a reference address. The reference address is word signal group and the word signal group alignment addresses (WB) are also shown. This criterion is referred to as an "exact" criterion. In this example, event signal 1 does not generate an event signal because, although the touching requirement is met, the word group is not aligned with the reference address. No event signal is generated for signal group 2 because, although the 'exact requirement is met, the touching requirement is not met. An event signal is generated for signal group 3 because the signal group is aligned with the reference signal group and the touching requirement is met. For signal group 4, an event signal is not generated because although the touching requirement is met, the exact (alignment) requirement is not met. With respect to signal group 5, a single byte is shown as not generating an event signal. This result arises from the fact that, although the touching requirement is met, the reference signal group is a word. The signal group 5 is not aligned with a word boundary defined by the reference signal group.

In FIG. 5A and FIG. 5B, only one of the two comparators is required to generate and event signal for the exemplary requirements.

In FIG. 5C, an example is given wherein both comparator one and comparator two are needed to generate an EVENT signal. In this example, a portion of the address must in a region defined by being less than a designated address #1 or being greater than a designated address #2. Because of these two criteria, one criterion must be tested by each comparator. Signal group 1 results in the generation of an event signal because it is at least partially in the region defined by designated address #1 thereby fulfilling a touching requirement. Similarly, signal group 2 is at least partially in region defined by designated address #2 and thereby also meets the touching requirement. Signal group 3 does not meet either touching requirement and therefore no event signal is generated.

2. Operation of the Preferred Embodiment

The operation of the comparator unit of the present invention can be understood as follows. The data qualifying unit 49 determines when the data associated with the address (es) to be analyzed has the required characteristics. The data qualifying logic 411 then provides a signal that determines whether the analysis of the address in the comparator logic can continue. When the process can continue, the comparator logic determines one selected characteristic of the address applied by the bus. The selected characteristic is determined by the control signals that are typically selected by the user for the currently executing program. The selected characteristic is the relationship of the address signal group to a designated or reference address. When the selected characteristic is present, then a signal is applied to the event signal generation unit. As a result of this signal, an EVENT signal is generated.

While the foregoing example determines the relationship of an address signal group to a single designated, reference address, the fact that the two comparators are interconnected permits the comparator unit 40 to determine the relationship of an address signal group to two designated, reference addresses, i.e., one reference address in each comparator. In other words, the use of both comparators permits the comparator unit to determine the relationship of an address signal group to a region of addresses.

The comparator of the present invention is particularly useful in the test and debug procedures of a target processor. In analyzing the operation of target processing system, it is important to know the events that result in the change in operation produced by a trigger signal. The present invention captures an identification of the events that result in the change in operation, e.g., the transition to an interrupt service routine. These events are captured only in the event that an actual trigger signal is generated. Upon the generation of a trigger signal, signals specifying the events causing the trigger signal are stored and can be transferred to the host processing unit for analysis. In addition, it is necessary to determine where in the program execution the trigger signal occurred as well as the events that resulted in the generation of the trigger signal. The contents of the program counter are the best indication of the state of program execution at the time of the trigger signal. However, because of the pipeline delay (and, if present, a pipeline flattener delay), the events that result in the generation of the trigger signal are the result of instructions that began execution before the delay. Consequently, in order to correlate the events causing the trigger signal with the appropriate instruction identified by the program counter, a delay is added in the instruction applied to the register. In this manner, the target processor events resulting in the generation of a trigger signal and the related position in the instruction execution can be identified and transferred to the host processing unit for analysis. In the preferred embodiment shown in FIG. 2 and FIG. 3, bus A and bus B are both coupled to the addresses referenced by the program counter. The comparator unit is then used to generate an EVENT signal that is applied to the trigger unit. However, the comparator of the present invention has wider application. For example, two addresses can be applied to the comparator on the two buses and analyzed separately.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A comparator unit for use in testing and debugging a processor, the comparator unit comprising:
   an first comparator responsive to a first address signal group and to first control signals, the first comparator determining when one of a plurality selected characteristics are present in the first address signal group;
   a second comparator responsive to a second address signal group and to second control signals, the second comparator determining when a second of the plurality of selected characteristics is present in the second address signal group;
   an inter-comparator conductor, the inter-comparator conductor applying an indicia of an identification of the second selected characteristic to the first comparator, the first comparator generating an event signal when the first and the second selected characteristics are present; and
   a data qualification unit coupled to the first and second comparators, the data qualification unit receiving architecture status signals from the processor, the data qualification unit applying enabling signals to the first and second comparators.

2. The comparator unit as recited in claim 1 wherein the first and the second address signal groups are the same address signal group.

3. The comparator unit as recited in claim 1 wherein the first and second selected characteristics are selected from the group consisting of an exact characteristic, a touching characteristic, a touching less than the address signal characteristic and a touching greater than the address signal characteristic.

4. The comparator unit as recited in claim 1 wherein either one of the first and the second comparator can generate an event signal when at least one of a touching requirement and an exact requirement is satisfied by an applied address signal group.

5. A comparator unit for use in a test and debug system for a processing unit; the comparator unit comprising:
   a first comparator and a second comparator, each comparator including:
      a comparison logic unit for comparing an input address signal group with a control address signal group to determine when a selected one of a plurality of characteristics is present; and
      an intercompartor conductor for providing the results in one comparator to the other comparator;
   a data qualification unit coupled to the first and second comparators, the data qualification unit receiving architecture status signals from the processing unit, the data qualification unit applying enabling signals to the first and second comparator; and
   an event signal generation unit, the comparison logic unit applying a signal to the event generation unit of the other comparator when the selected characteristic is identified, the event generation unit generating an event signal when the signals from the two comparators have identified the selected characteristic associated in both comparators.

6. The comparator unit as recited in claim 5 wherein the selected characteristics are selected from a group consisting of an exact characteristic and a touching characteristic.

7. The comparator unit as recited in claim 6 wherein the address signal groups are the same signal group.

8. The comparator unit as recited in claim 5 wherein the selected characteristics are entered in the comparison logic unit by control signals.

9. The comparator as recited in claim 8 wherein each comparator can operate independently, each comparator capable of generating an event signal in response to at least one of a touching requirement and an exact requirement.

10. In a host processing unit, the method of determining when a first and a second input address signal group each meets at least one selected characteristic, the method comprising:
   qualifying the first input address signal group;
   determining in a first comparator when the first input signal group has a first selected characteristic relative to a first reference address;

qualifying the second input address signal group;

determining in a second comparator when the second input address signal group has a second selected characteristic relative to a second reference address;

coupling the results of the first comparator and the second comparator; and generating an output signal when the first and the second predetermined conditions are met, the output signal controlling the operation of a host processor.

11. The method as recited in claim 10 further comprising identifying the position in the program execution with a program counter signal, the program counter signal being one of the address signal groups.

12. The method as recited in claim 10 further comprising applying a signal to the comparators indicative of an associated signal group characteristic, the signal controlling generation of the output signal.

13. In a target processor, apparatus for generating a trigger signal, the apparatus comprising:

a plurality of event signal generating units, wherein at least one of the event signal generating units is a comparator unit, the comparator unit including:

a first comparator and a second comparator, each comparator having:

a comparison logic unit for comparing an input address signal group with a control signal group to determine when one of a plurality of selected characteristics is present;

an inter-comparator conductor for communicating the results of one comparator to the other comparator; and an event signal generating unit, the comparison logic unit applying a signal to the event generating unit and to the event signal generating unit of the second comparator when the selected characteristic is identified, the event generating unit generating an event signal when the signals from the two comparator logics have predetermined logic values;

a data qualification unit coupled to the first and second comparators, the data qualification unit receiving architecture status signals from the target processor, the data qualification unit applying enabling signals to the first and second comparators; and a trigger generation unit coupled to the plurality of event signal generation units, the trigger generation unit responsive to at least one preselected event signal for generating a trigger control signal, the trigger generation unit generating a trigger control signal for initiating a test procedure.

14. The target processor as recited in claim 13 wherein the comparator unit receives a program counter address input signal identifying the position in the program execution.

15. The target processor as recited in claim 13 wherein one comparator receives a program counter address counter address input signal and the second comparator receives an address signal group referenced by the program counter address.

16. The target processor as recited in claim 13 wherein the preselected condition is selected from the group consisting of a touching requirement, an exact requirement, a touching requirement, a touching less than the address signal requirement and a touching greater than the address signal requirement.

* * * * *